US008948093B2

United States Patent
Xu et al.

(10) Patent No.: US 8,948,093 B2
(45) Date of Patent: Feb. 3, 2015

(54) RANK ADAPTATION FOR AN OPEN LOOP MULTI-ANTENNA MODE OF WIRELESS COMMUNICATION

(75) Inventors: Hua Xu, Nepean (CA); Jianming Wu, Yokosuka (JP); Jianglei Ma, Kanata (CA); Ming Jia, Ottawa (CA); Mohammadhadi Baligh, Ottawa (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 12/195,114

(22) Filed: Aug. 20, 2008

(65) Prior Publication Data

US 2009/0086648 A1 Apr. 2, 2009

Related U.S. Application Data

(60) Provisional application No. 60/976,933, filed on Oct. 2, 2007.

(51) Int. Cl.
*H04W 4/00* (2009.01)
*H04B 7/06* (2006.01)
(52) U.S. Cl.
CPC .............. *H04B 7/0689* (2013.01); *H04B 7/063* (2013.01); *H04B 7/0632* (2013.01)
USPC .......................................... 370/329; 370/480
(58) Field of Classification Search
None
See application file for complete search history.

(56) References Cited

U.S. PATENT DOCUMENTS

| 2005/0243942 | A1  | 11/2005 | Sawai |  |
|---|---|---|---|---|
| 2007/0160162 | A1* | 7/2007  | Kim et al. | 375/267 |
| 2007/0211815 | A1* | 9/2007  | Pan et al. | 375/267 |
| 2008/0080634 | A1* | 4/2008  | Kotecha et al. | 375/267 |
| 2008/0137634 | A1* | 6/2008  | Hassan et al. | 370/343 |
| 2008/0247364 | A1* | 10/2008 | Kim et al. | 370/336 |
| 2009/0318157 | A1* | 12/2009 | Hoshino et al. | 455/450 |
| 2010/0046445 | A1* | 2/2010  | Sawahashi et al. | 370/329 |

FOREIGN PATENT DOCUMENTS

| WO | 2005/081444 | 9/2005 |
|---|---|---|
| WO | 2005/096531 | 10/2005 |

OTHER PUBLICATIONS

Canadian Patent Office, Combined International Search Report and Written Opinion, issued in corresponding PCT Application No. PCT/IB2008/003841, 12 pages, Jul. 7, 2009.
Office Action from Korean Application No. 10-2010-7009621, issued Jul. 29, 2014, English and Korean versions, pp. 1-13.
"Baseline uplink E-CQI Message—content and size", Huawei, Oct. 9-13, 2006, pp. 1-4.

* cited by examiner

*Primary Examiner* — Christine Duong
(74) *Attorney, Agent, or Firm* — Meyertons, Hood, Kivlin, Kowert & Goetzel, P.C.

(57) ABSTRACT

To perform rank adaptation for a mobile station in a wireless network, it is determined whether the mobile station is fast moving. In response to determining that the mobile station is fast moving, an open loop multi-antenna mode is selected to perform wireless communication between the mobile station and a base station. Also, selection is made from among plural ranks for the wireless communication according to the open loop multi-antenna mode between the mobile station and the base station.

16 Claims, 4 Drawing Sheets

RANK ADAPTATION FOR AN OPEN LOOP MULTI-ANTENNA MODE OF WIRELESS COMMUNICATION

CROSS-REFERENCE TO RELATED APPLICATIONS

This application claims the benefit under 35 U.S.C. §119 (e) of U.S. Provisional Application Ser. No. 60/976,933, entitled "Rank Adaptation for High Mobility UE," filed Oct. 2, 2007, which is hereby incorporated by reference.

TECHNICAL FIELD

The invention relates generally to rank adaptation for an open loop multi-antenna mode of wireless communication between a mobile station and a base station.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

According to LTE, rank adaptation is afforded for channel-dependent precoding (closed-loop) MIMO (multiple input, multiple output) wireless transmission using information that is fed back from the mobile station to a base station. MIMO refers to the use of multiple antennas at the transmit side and/or the receive side. Rank adaptation refers to selecting from among plural ranks, such as rank 1 and rank 2, for wireless communications between the mobile station and the base station. "Rank 1" refers to use of just a single layer for the wireless channel that communicates data between the base station and mobile station. With such single-layer communications, the same signal is emitted from each of the transmit antennas (such that redundancy is provided) with appropriate phase (and sometimes gain) coding such that signal power is maximized at the receiver input. "Rank 2" indicates that a particular wireless channel used to communicate data between the base station and the mobile station is able to use two layers that employ multiple spatial beams along multiple paths in a cell sector. With rank 2 communications, independent data can be sent in multiple beams to increase throughput of the data in the wireless communication between the mobile station and the base station. Other ranks are also possible, such as rank 4 and so forth.

The information fed back by the mobile station as part of channel-dependent precoding (closed loop MIMO) to a base station includes an index to identify a codeword used for coding data to be sent on the downlink wireless channel from the base station to the mobile station. Such an index is referred to as a precoding matrix index (PMI) in the LTE context. Different indexes are used to select different codewords. The feedback information also includes the rank to be used as determined by the mobile station. Such feedback of rank information enables rank adaptation, where one of multiple ranks can be selected for wireless communications. The precoding (rank and codeword) to be applied to downlink data to be transmitted by the base station is then determined from the rank and PMI information. By applying precoding (including rank adaptation) based on feedback information from the mobile station, throughput and reliability of wireless data communications within a cell or cell sector can be improved.

However, conventional precoding for closed-loop MIMO transmission is effective only for mobile stations that are relatively slow moving such that the information (in particular, the PMI information) fed back by the mobile station to the base station is not out-of-date when the precoding is applied by the base station. As the mobile station's velocity increases, precoding used for closed-loop MIMO transmission may not be beneficial.

SUMMARY

In general, according to an embodiment, a method of performing rank adaptation for a mobile station in a wireless network includes determining whether the mobile station is fast moving. In response to determining that the mobile station is fast moving, an open loop multi-antenna mode is selected to perform wireless communication between the mobile station and the base station. Selection is then performed among plural ranks for the wireless communication according to the open loop multi-antenna mode between the mobile station and the base station.

Other or alternative features will become apparent from the following description, from the drawings, and from the claims.

DETAILED DESCRIPTION

Figure 1:
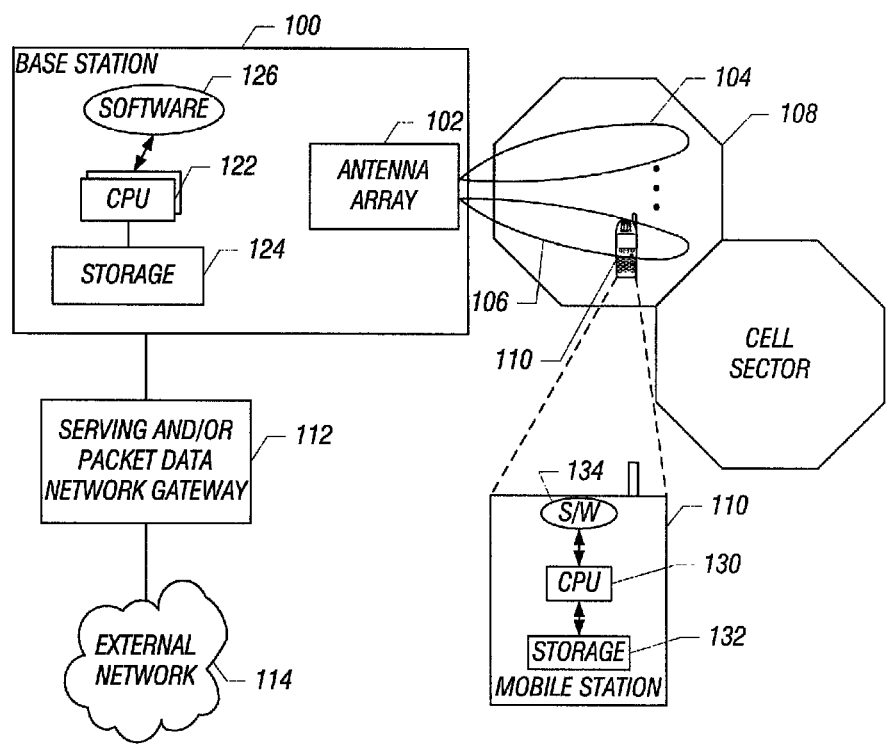
FIG. 1 is a block diagram of a communications network that includes a wireless network that employs rank adaptation for wireless communications according to an open loop multi-antenna mode, in accordance with an embodiment.

In the following description, numerous details are set forth to provide an understanding of some embodiments. However, it will be understood by those skilled in the art that some embodiments may be practiced without these details and that numerous variations or modifications from the described embodiments may be possible.

In a wireless network that incorporates some embodiments of the invention, various multi-antenna modes can be supported on a downlink wireless channel (from base station to mobile station), such as a physical downlink shared channel (PDSCH) or other type of data channel. A PDSCH channel is a channel that exists in a Long Term Evolution (LTE) wireless network as defined by the Third Generation Partnership Project (3GPP). The 3GPP LTE technology is an evolution of the UMTS (Universal Mobile Telecommunications System) technology, also promulgated by 3GPP. Although reference is made to the LTE technology according to some embodiments, note that these techniques can also be applied to other wireless technologies, such as CDMA 2000 (Code Division Multiple Access 2000) technologies, defined by 3GPP2, or other wireless access technologies. Also, although the ensuing discussion is directed to techniques applied to downlink communication, it is noted that some embodiments of the invention can also be applied to uplink communications.

A multi-antenna mode can be a MIMO (multiple input, multiple output) mode, in which multiple transmission antennas are used at the transmitter and multiple receive antennas are used at the receiver. In some embodiments, the various multi-antenna modes that can be supported by the wireless network include a closed loop MIMO mode and an open loop MIMO mode. Closed loop MIMO mode refers to a MIMO mode in which downlink data is preceded using preceding determined from feedback information from the mobile station that includes rank information, an index to a codeword, and other information (e.g., indication of wireless channel quality such as a channel quality indicator or CQI). The index (or other type of identifier) allows the base station to select from among multiple possible codewords for coding the downlink data.

With the open loop MIMO mode, a fixed (or predetermined) codeword (instead of variable codewords as used with closed loop MIMO) is used to code downlink data. As a result, the base station applies a fixed (or predetermined) codeword to the downlink data. With the open-loop MIMO mode, no feedback of PMI from the mobile station is required. Alternatively, instead of using a fixed or predetermined codeword, a predetermined codeword sequence can be used instead.

In accordance with some embodiments, a velocity of a mobile station can be detected, and a multi-antenna mode can be selected based on the velocity of the mobile station. When the mobile station velocity is relatively low, then closed loop MIMO mode can be employed, in which variations in the channel can be tracked, and the mobile station is able to select a codeword to be used for coding downlink data. The selected codeword is fed back to the base station in the form of an index (or other identifier) to the selected codeword. Variations in the channel that can be detected by the mobile station include channel condition changes that are based on the position of the mobile station, path losses that are based on the distance of the mobile station from a base stations shadowing that is caused by obstacles around the base station, and other factors.

The codewords can be selected from a codebook that includes a number of entries containing corresponding codewords that can be selectively used for coding data. The codebook can be arranged as a matrix, in some exemplary implementations. The matrix can have rows corresponding to codebook indexes, and columns corresponding to ranks. Thus, a number of codewords in the codebook correspond to rank 1, and other codewords in the codebook correspond to rank 2. The codebook can also include entries corresponding to other ranks. As noted above, with closed loop MIMO communications, rank information and an index (referred to as a preceding matrix index or PMI in the LTE context) can be fed back from the mobile station to the base station. This allows the base station to select a codeword to apply to downlink communication (from the base station to the mobile station).

For slow moving mobile stations, the base station also performs localized channel assignment, in which consecutive physical resource blocks (RBs) are assigned to a given mobile station. A physical resource block refers to a defined number of consecutive symbols in the time domain and a number of consecutive subcarriers in the frequency domain.

However, the effectiveness of closed loop MIMO (channel-dependent preceding) is compromised in instances involving high-velocity mobile stations. A "high-velocity mobile station" or "fast moving mobile station" is a mobile station that is moving at a velocity greater than some predefined threshold, such as greater than 30 kilometers per hour (km/h). The effectiveness of closed loop MIMO is compromised when a mobile station is fast moving because feedback (including the PMI) provided by a mobile station can become obsolete relatively quickly, such that any decision made by the base station according to feedback from the mobile station may not provide optimal results. Also, for a fast moving mobile station, distributed or diversity channel assignment is usually used, in which resource blocks allocated to a given mobile station do not have to be consecutive and can be from different parts of the frequency band. Since ranks for different parts of the band are different, closed loop MIMO for a fast moving mobile station is not effective for this further reason.

As a result, in accordance with some embodiments, for a high-velocity mobile station, a fixed (or predetermined) codeword is used for performing coding of downlink data sent from the base station to the mobile station. The use of fixed (or predetermined) preceding is part of the open loop MIMO mode used for transmission of downlink data to the high-velocity mobile station.

In addition to using fixed (or predetermined) preceding, rank adaptation can also be employed for the open loop MIMO mode, to enhance communications throughput and reliability according to some embodiments. For example, in some embodiments, for open loop MIMO mode, rank 1 or rank 2 can be selected based on the wireless channel conditions. For example, the rank adaptation can be based on a long-term SINR (signal-to-interference-plus-noise ratio). A "long-term" SINR refers to some aggregation of a currently measured SINR and previously measured SINRs. The aggregation can be an average, or alternatively, could be some other aggregation (e.g., median, sum, etc.). In other embodiments, instead of using SINR to provide an indication of the wireless channel quality, some other type of parameter can be used instead.

Basically, a "poor" channel condition (relative to predetermined or otherwise established criteria) will indicate that rank 1 communications is to be used, whereas a "better" quality channel condition (relative to such criteria) would indicate that rank 2 communications can be used. In some implementations, the rank 1 scheme is a transmit diversity scheme in which the same information (redundant information) is sent over different paths (spatial beams) to a mobile station to increase the likelihood that the mobile station will receive the downlink data. For example, the transmit diversity format can be the spatial frequency block coding (SFBC) format.

Rank 2 communications provide spatial multiplexing in which two antennas of the transmitter are used to transmit independent downlink data to be received by corresponding antennas of the receiver. Thus, in accordance with some embodiments, for a mobile station with high mobility (high velocity), dynamic rank adaptation is provided for an open loop multi-antenna mode such that rank 1 communications or rank 2 communications can be utilized to increase both throughput and coverage gain. In other embodiments, additional ranks can be supported.

Thus, according to some embodiments, for a slow moving mobile station, codebook based channel-dependent precoding (closed loop MIMO) with rank adaptation can be used. For a fast moving mobile station, an open loop MIMO mode with rank adaptation can be used, where the rank selected is based on wireless channel conditions.

FIG. 1 shows an exemplary wireless network in which some embodiments of the invention can be provided. The wireless network includes a base station 100 that includes an antenna array or other assembly (multi-beam antenna) 102 for sending wireless signals along multiple paths 104, 106 (spatial beams) in a corresponding cell sector 108. A cell sector is one section of a cell of a cellular network. Although just two paths 104 and 106 are depicted in FIG. 1, it is noted that more than two paths can be provided in a cell sector in other embodiments. Radio frequency (RF) resources (e.g., frequencies, time slots, etc.) can be reused in different geographic regions of a cell sector by transmitting wireless signals along different paths using multi-beam antennas. A mobile station 110 can communicate using one or more of the paths 104, 106 in the cell sector 108, depending upon the position of the mobile station 110 in the cell sector.

In alternative implementations, rather than providing multiple beams in a cell sector, it is noted that multiple beams can be provided in a cell. As used here, the term "cell segment" can refer to either a cell sector or a cell.

Although just one base station is depicted in FIG. 1, it is noted that a wireless network would typically include multiple base stations. In some implementations, the wireless network is an LTE wireless network. In alternative implementations, other types of wireless networks can be employed. Note that reference to a "LTE wireless network" refers to a wireless network that conforms to the requirements of the specification developed by 3GPP, as that specification is modified or evolved over time, as well as to subsequent standards that evolve from LTE. Moreover, even though reference is made to LTE wireless networks in the ensuing discussion, it is noted that techniques according to preferred embodiments can also be applied to non-LTE wireless networks. In non-LTE wireless networks, the term "base station" can refer to any transmitter that is able to transmit data to, or receive data from, a mobile station. More generally, the term "base station" can refer to a cellular network base station, an access point used in any type of wireless network, or any type of transmitter to communicate with mobile stations.

In an LTE wireless network, the base station 100 includes an enhanced node B ("eNode B"), which includes a base transceiver station that includes the antenna array 102. The base station 100 also includes a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple eNode Bs, or alternatively, an eNode B can be accessed by more than one radio access controller.

As depicted in FIG. 1, the base station 100 includes one or more central processing units (CPUs) 122, which is (are) connected to storage 124. Moreover, the base station includes software 126 that is executable on the CPU(s) 122 to perform tasks of the base station 100, including tasks according to preferred embodiments to enable support for SDMA in the LTE wireless network.

The mobile station 110 of FIG. 1 also includes one or more CPUs 130 that are connected to storage 132. The mobile station 110 also includes software 134 that is executable on the CPU(s) 130 to perform tasks of the mobile station 110.

The base station 100 is connected to a serving and/or packet data network (PDN) gateway 112, which terminates the user plane interface toward the enhanced node B and assumes the responsibility for packet routing and transfer towards an external network 114, which can be a packet data network such as the Internet or other type of network.

The arrangement depicted in FIG. 1 is provided for purposes of example. In other implementations, other wireless network arrangements are used.

Figure 2:
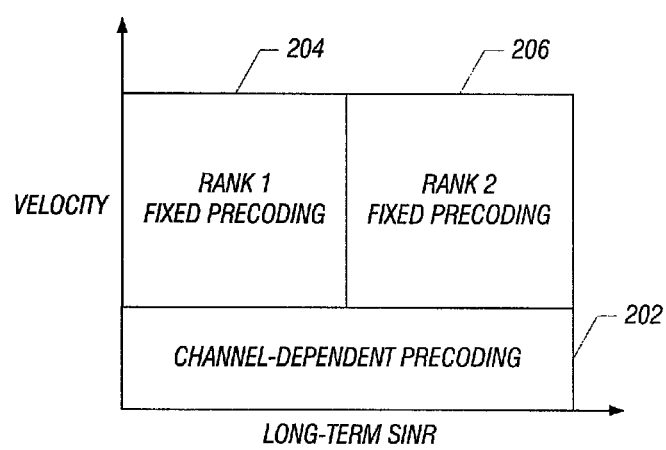
FIG. 2 illustrates a graph that depicts multi-antenna modes that are selectively used based on detected wireless channel quality and velocity of a mobile station, according to an embodiment.

FIG. 2 illustrates an exemplary graph that depicts different multi-antenna modes used depending on the velocity of the mobile station (vertical axis of the graph) and the long-term SINR (horizontal axis of the graph). For non-moving and low-velocity mobile stations (collectively referred to herein as "low-velocity mobile stations"), channel-dependent precoding (closed loop MIMO) is used (as indicated by 202). In contrast, for a high-velocity mobile station, fixed (or predetermined) precoding is used, in combination with dynamic rank adaptation, in which rank 1 is used if the long-term SINR is relatively low (block 204 in FIG. 2), and rank 2 is used if the long-term SINR is relatively high (block 206). A threshold can be defined for the long-term SINR; if the long-term SINR is below the threshold, then rank 1 is used, and if the long-term SINR is above the threshold, rank 2 is used.

Figure 3:
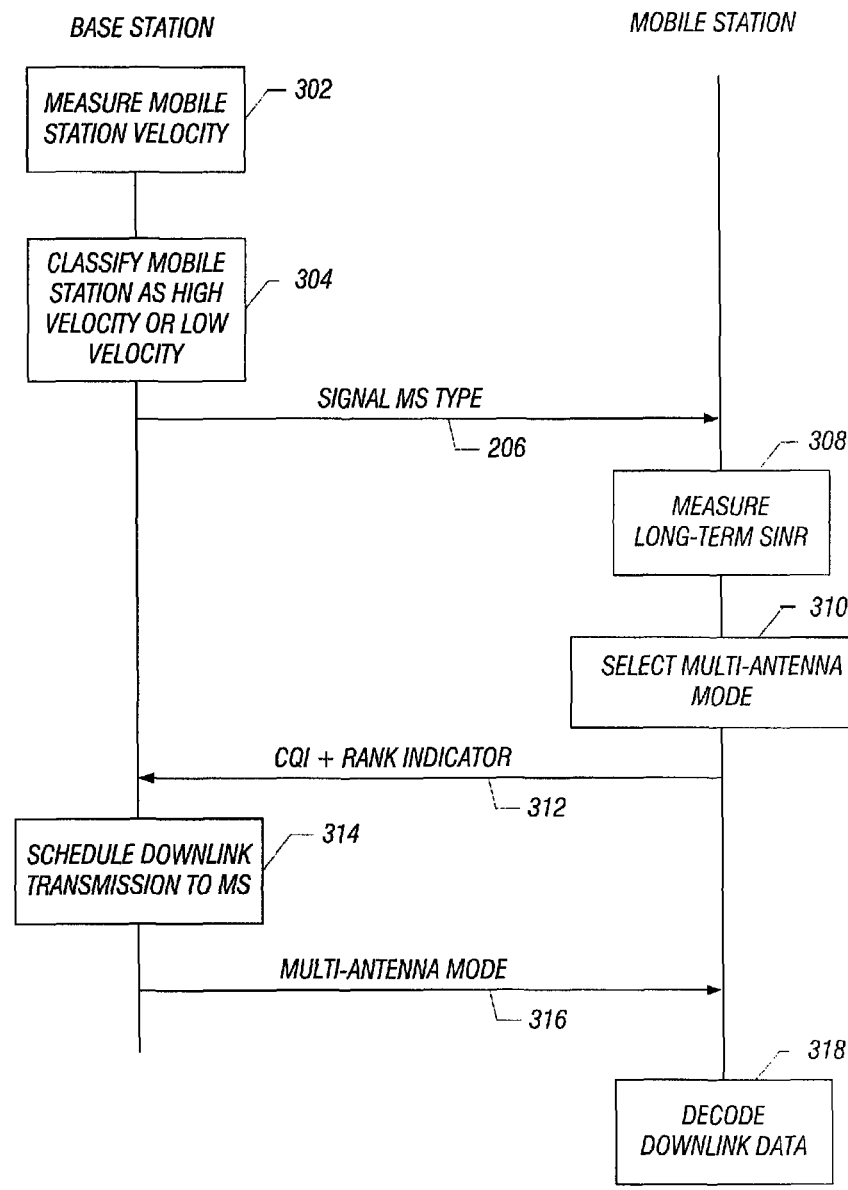
FIGS. 3 and 4 are flow diagrams of processes of performing rank adaptation for an open loop multi-antenna mode, according to some embodiments.

FIG. 3 illustrates a procedure performed according to an embodiment. The base station measures (at 302) a velocity of the mobile station. The measured velocity can be an approximate velocity, and can be based, for example, on monitoring a random access channel (RACH) sent on the uplink from the mobile station to the base station, or a sounding reference signal (SRS) from the mobile station, or any other uplink transmission. RACH is sent by the mobile station to establish a call or other communications session. The sounding reference signal is a reference signal sent by the mobile station to enable the base station to determine which beam (path) the mobile station will be using for uplink data. GPS or other position determination data can also be used for determining mobile station velocity. Signal(s) from the mobile station is (are) monitored by the base station to determine approximately the velocity of the mobile station.

Based on the measured velocity, the base station classifies (at 304) the mobile station as a "high-velocity" or "low-velocity" mobile station. The base station then signals (at 306) the mobile station type (high-velocity or low-velocity) to the mobile station. The signaling sent to communicate the mobile station type can be a higher layer signaling, such as level 3 (or higher level) signaling. Using higher layer protocols (software) to measure mobile station velocity can be more efficient since the process of measuring mobile station velocity can take time on the order of hundreds of milliseconds, in some implementations.

According to the mobile station type received from the base station, the mobile station measures (at 308) the SINR, which in some embodiments, can be reported in the form of a channel quality indicator (CQI). The CQI information provides information regarding the quality of wireless signaling sent along a particular channel that is detected by the mobile station. For a high-velocity mobile, the measured CQI is the CQI corresponding to transmit diversity and a fixed or predetermined codeword. The fixed or predetermined codeword can be a predefined codeword in the codebook defined for the closed loop MIMO mode. For a low-velocity mobile station, the measured CQI is the CQI corresponding to a codeword in the codebook.

The mobile station then selects (at 310) the MIMO mode with the largest SINR. If closed-loop MIMO is selected, a rank and codebook index (e.g., PMI) are also derived and associated with the closed loop MIMO. If open loop MIMO mode is selected, the rank is selected, but the codeword is fixed (e.g., the codebook index is predefined). Note that in some implementations the selection between the open loop MIMO mode and closed loop MIMO mode can be signaled by a higher layer software (level 3 or higher) that also measures or receives an indication of the mobile station velocity.

Next, the mobile station sends (at 312) a feedback message to the base station that contains a rank indicator along with the SINR information. The sending of feedback information at 312 can be performed periodically (or aperiodically). According to a first technique, the SINR information is provided in the form of CQI reports that are periodically (or aperiodically) sent by the mobile station to the base station. The rank indicator can be sent in each CQI report in this first technique. Alternatively, according to a second technique, the rank indicator can be sent every Nth CQI report, where N>1 (N is a configurable value). The rank indicator can be added as additional bit(s) to the CQI report, or alternatively, the rank indicator can replace existing bit(s) of the CQI report (a process referred to as puncturing the CQI report).

The frequency of sending the rank indicator defines the rank adaptation interval. Sending the rank indicator more frequently means that the rank adaptation interval is shorter (which means that the rank is dynamically varied more frequently).

In response to the rank indicator and the received SINR, the base station schedules (at 314) the downlink data transmission to the mobile station. The base station determines the multi-antenna mode to be used based on the velocity of the mobile station and the rank feedback. Note that the base station can override the rank selected by the mobile station (as reported in the rank indicator received from the mobile station). The mode selected by the base station can either be closed loop MIMO mode or open loop MIMO mode with rank adaptation.

The base station also determines the assigned channel type based on the mobile station category, where the assigned channel type is either distributed or diversity channel assignment (for a high-velocity mobile station) or localized channel assignment (for a low-velocity mobile station). The switching between the closed loop MIMO mode and the open loop MIMO mode for downlink transmission can be associated with the channel type.

Next, the base station signals (at 316) the selected MIMO mode to the mobile station, where the signaled MIMO mode can include rank information (for open loop MIMO) or rank and codebook index information (for closed loop MIMO). Other information can also be sent from the base station to the mobile station at 316.

In some implementations, two downlink signaling channels can be used to provide the MIMO mode. For example, a first signaling channel can indicate whether closed loop MIMO or open loop MIMO is to be used. If closed loop MIMO is to be used, then a second signaling channel is used to indicate the rank and the codebook index. In some embodiments, if open loop MIMO is to be used, then the second signaling channel is used to indicate the rank (transmit diversity or spatial multiplexing.

The mobile station then decodes (at 318) the downlink data sent from the base station according to the mobile station category (high-velocity versus low-velocity) and the mode indicator sent from the base station, such as rank or rank and codebook index.

Figure 4:
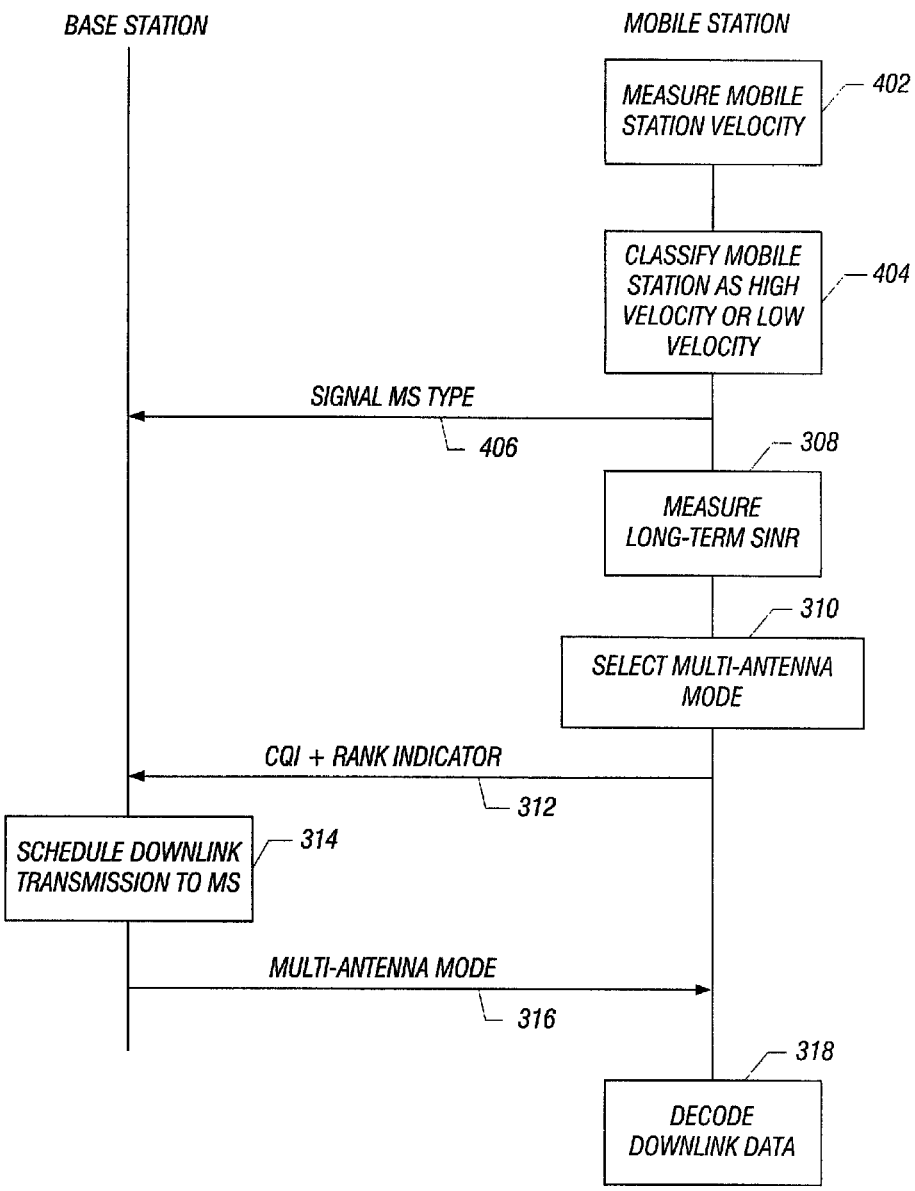

FIG. 4 is a message flow diagram of a process according to a different embodiment. In the FIG. 4 procedure, unlike the FIG. 3 procedure, it is the mobile station (rather than the base station) that measures the velocity of the mobile station. The mobile station can measure (at 402) the mobile station's velocity by monitoring downlink transmissions, such as the downlink supplemental channel, downlink reference or pilot signal, or any other downlink transmission. The mobile station then classifies (at 404) the mobile station as either a high-velocity or low-velocity mobile station according to the measured velocity. The mobile station then informs (at 406) the mobile station category to the base station, such as by using a higher layer (e.g., level 3) signaling.

The remaining tasks of FIG. 4 are identical to the tasks depicted in FIG. 3 (and are assigned the same reference numerals).

At the mobile station, rank adaptation (performed as part of MIMO mode selection in task 310 in FIG. 3 or 4) between rank 1 (e.g., SFBC) and rank 2 (e.g., SM) may rely on the procedure as follows:

Based on the downlink reference signal, the mobile station receiver estimates the channel and calculates effective SINRs for both SFBC and SM, denoted as $SINR^{(SFBC)}$ and $SINR^{(SM)}$, respectively.

Based on $SINR^{(SFBC)}$ and $SINR^{(SM)}$, the mobile station computes both SFBC and SM capacities using a Shannon formula:

$$C^{(SFBC)} = \log_2(1 + SINR^{(SFBC)}),$$

$$C^{(SM)} = M^{(TX)} \cdot \log_2(1 + SINR^{(SM)}),$$

where $M^{(TX)}$ is the number of transmit antennas.

A comparison of the two computed capacities enables the mobile station decides whether SFBC or SM is to be used, according to the following:

If $C^{(SFBC)} \geq C^{(SM)} \Rightarrow$ SFBC transmission (rank 1)

If $C^{(SFBC)} < C^{(SM)} \Rightarrow$ SM transmission (rank 2)

The above provides an example of how the mobile station can compare parameters computed based on SINR values for rank 1 operation and rank 2 operation to determine whether to select rank 1 or rank 2.

As discussed above, in the procedure of FIG. 3 or 4, as part of scheduling the downlink transmission performed at 314, the base station can override the rank selection made by the mobile station as follows:

Count the number of decisions ($N^{(SFBC)}$) for SFBC fed back by the mobile station over a predefined observation time window.

Count the number of decisions ($N^{(SM)}$) for SM fed back by the mobile station over the predefined observation time window.

The base station selects SFBC when $N^{(SFBC)} \geq N^{(SM)}$; otherwise the base station selects SM.

The selection by the base station of whether to use rank 1 or rank 2 is thus based on a comparison of times the mobile station selected rank 1 in the predefined observation window, and the number of times the mobile station selected rank 2 in the predefined observation window—the base station will select the rank that the mobile station picked most in the predefined observation window.

In some embodiments, if the rank selected by the base station is greater than one, then the base station can employ a large delay cyclic delay diversity (CDD), which is a diversity scheme that transforms spatial diversity into frequency diversity to reduce inter-symbol interference. The operation of the large delay CDD according to an embodiment is further defined as follows:

For a transmitter with two antenna ports, the precoder for data resource element i, denoted by W(i), is selected from a codebook that includes codewords for ranks 1 and 2. An example of such a codebook is described in 3GPP TS 36.211, Version 8.30. A data resource element is an element of a resource block, discussed above. A resource block includes a number of resource elements. The selected precoder applies the codeword W(i).

For a transmitter with four antenna ports, the mobile station may assume that the base station cyclically assigns different precoders to different data resource elements on the physical downlink shared channel as follows. A different precoder is used every v data resource elements, where v denotes the number of transmission layers in the case of spatial multiplexing. In particular, the precoder for data resource element i, denoted by W(i), is selected according to $W(i)=C_k$, where k is the precoder index given by $$k = \mathrm{mod}\left(\left\lceil \frac{i}{v} \right\rceil - 1, 4\right) + 1,$$

where k=1, 2, ... 4, and $C_1$, $C_2$, $C_3$, $C_4$ are codewords from a codebook that contains entries for four ranks. An example of such a codebook is described in 3GPP TS 36.211, Version 8.30.

By employing techniques according to some embodiments, rank adaptation is enabled for high-velocity mobile stations, for which an open loop multi-antenna mode is selected. System capacity can be enhanced while maintaining a desired level of wireless communications reliability.

Instructions of such software are executed on the processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing rank adaptation for a mobile station in a wireless network, comprising:
   determining, by one of the mobile station and a base station, a velocity of the mobile station;
   in response to determining that the velocity of the mobile station is above a predefined threshold, selecting an open loop multi-antenna mode to perform wireless communication between the mobile station and the base station;
   selecting from among plural ranks for the wireless communication according to the open loop multi-antenna mode between the mobile station and the base station, wherein selecting from among the plural ranks for the wireless communication according to the open loop multi-antenna mode is based on a long-term signal-to-interference-plus-noise ratio (SINR) of a wireless channel between the mobile station and base station, and wherein selecting from among the plural ranks is further based on whether the long-term SINR exceeds a threshold;
   sending, by the mobile station, an indication of a selected rank to the base station; and
   receiving, from the base station, an indication of a new rank, wherein the new rank overrides the selected rank, and wherein the new rank is based on a comparison of a number of times a first of the plural ranks were selected to a number of times a second of the plural ranks were selected.

2. The method of claim 1, wherein selecting from among the plural ranks comprises selecting from among at least a first rank that employs transmit diversity and a second rank that employs spatial multiplexing.

3. The method of claim 1, further comprising: receiving, from the mobile station, an identifier for a codeword to use for coding data in wireless communication according to a closed loop multi-antenna mode.

4. The method of claim 1, further comprising: using, in the open loop multi-antenna mode, a predetermined codeword or a codeword sequence to code data of the wireless communication.

5. The method of claim 4, wherein the predetermined codeword is a predefined codeword in a codebook used for a closed loop multi-antenna transmission mode.

6. The method of claim 1, further comprising: receiving, by the base station from the mobile station, information relating to long-term SINR.

7. The method of claim 1, wherein selecting from among the plural ranks for the wireless communication according to the open loop multi-antenna mode comprises selecting a rank greater than rank 1, the method further comprising: using cyclic delay diversity when the rank selected is greater than rank 1.

8. The method of claim 1, further comprising: in response to determining that the velocity of the mobile station is below the predefined threshold, selecting a closed loop multi-antenna mode in which selection of a codeword to apply precoding on wireless communication between the mobile station and base station is based on feedback information from the mobile station.

9. A base station comprising:
   an interface to perform wireless communication with a mobile station; and
   a processor configured to:
      determine whether the mobile station is a high-velocity mobile station;
      in response to determining that the mobile station is a high-velocity mobile station, select an open loop multi-antenna mode of communication for downlink data transmitted to the mobile station that does not involve feedback from the mobile station that includes an identifier of a codeword to be used for coding the downlink data; and
      apply rank adaptation to select from among a plurality of ranks for the communication of downlink data according to the open loop multi-antenna mode of communication, wherein the rank adaptation to select from among the plurality of ranks for the communication of downlink data comprises:

receiving an indication from the mobile station regarding selection by the mobile station of a particular rank from among the plurality of ranks, wherein the particular rank was selected by the mobile station based on a long-term signal-to-interference-plus-noise ratio (SINR) of a wireless channel between the base station and the mobile station, and wherein the particular rank was selected by the mobile station further based on whether the long-term SINR exceeds a threshold; and using the received indication to perform the rank adaptation to select from among the plurality of ranks;

wherein the rank adaptation to select from among the plurality of ranks is further based on comparing a count of a number of decisions by the mobile station to select a first of the plurality of ranks to a count of a number of decisions by the mobile station to select a second of the plurality of ranks, wherein the rank indicated by the received indication is reflected in the count of the number of decisions of the first rank or second rank, and wherein the selected rank based on the comparing is different than the particular rank received from the mobile station.

10. The base station of claim 9, wherein the processor is to apply a fixed codeword to the downlink data in the open loop multi-antenna mode.

11. The base station of claim 9, wherein the processor is to select a closed loop multi-antenna mode in response to determining that the mobile station is not a high-velocity mobile station.

12. The base station of claim 11, further comprising a higher layer software to signal, to the mobile station, selection of the open loop multi-antenna mode or closed loop multi-antenna mode.

13. A mobile station comprising:

an interface to perform wireless communication with a base station; and a processor configured to:

determine whether a velocity of the mobile station exceeds a predefined threshold;

in response to determining that the velocity of the mobile station exceeds the predefined threshold, select an open loop multiple input multiple output (MIMO) mode to perform wireless communication between the mobile station and the base station;

use rank adaptation to select from among plural ranks in the wireless communication according to the open loop MIMO mode, wherein selecting from among the plural ranks for the wireless communication according to the open loop multi-antenna mode is based on a long-term signal-to-interference-plus-noise ratio (SINR) of a wireless channel between the mobile station and base station, and wherein selecting from among the plural ranks is further based on whether the long-term SINR exceeds a threshold;

send, by the mobile station, an indication of a selected rank to the base station; and receive, from the base station, an indication of a new rank, wherein the new rank overrides the selected rank, and wherein the new rank is based on a comparison of a number of times a first of the plural ranks were selected to a number of times a second of the plural ranks were selected.

14. The mobile station of claim 13, wherein the processor is to select a closed loop MIMO mode to perform wireless communication between the mobile station and the base station in response to determining the velocity not exceeding the predefined threshold.

15. The method of claim 1, wherein selecting from among the plural ranks according to the long-term SINR of the wireless channel is further based on computed SINR for communications according to different ranks.

16. The mobile station of claim 13, wherein selecting from among the plural ranks according to the long-term SINR of the wireless channel is further based on computed SINR for communications according to different ranks.

* * * * *